Figure 1:
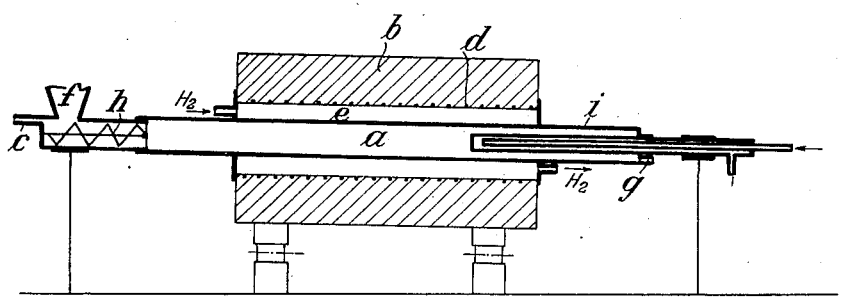

Aug. 16, 1938.     H. SELIGER     2,126,825

RECOVERY OF METALS FROM ORES

Filed May 25, 1934

Inventor
Hellmuth Seliger

By Attorney

Patented Aug. 16, 1938

2,126,825

UNITED STATES PATENT OFFICE 2,126,825

RECOVERY OF METALS FROM ORES

Hellmuth Seliger, Bitterfeld, Germany, assignor, by mesne assignments, to Magnesium Development Corporation, a corporation of Delaware Application May 25, 1934, Serial No. 727,429
In Germany June 3, 1933

7 Claims. (Cl. 75—67)

This invention relates to improvements in the recovery of metals from ores, and more particularly to a process of and apparatus for the continuous production of metallic magnesium by thermal reduction.

The production of metallic magnesium by the thermal reduction of magnesia and raw materials containing same, with the aid of silicon or of aluminium, or of mixtures containing both aluminium and silicon in a current of inert gas followed by the deposition of the magnesium vapour in the solid or liquid form, is known. In such case it is preferable to volatilize the magnesium at the lowest possible temperature, since the complete precipitation of the magnesium vapours is more difficult to effect the higher is the temperature of said vapours. In adapting the process from the laboratory scale to that of practical manufacture, this circumstance becomes a source of difficulties, since in the latter case the endeavour should be to carry out the process in a continuous manner, that is, so as to form a residual slag that can be tapped off in a liquid state and is, therefore, readily fusible. If, however, silicon be employed as the sole reducing agent, slags of high melting point are obtained, even when, as has already been proposed, dolomite be employed as the magnesium-bearing originating material. For the purpose of lowering the melting point of the resulting slag it has also been proposed to replace silicon as the reducing agent by a mixture of silicon and aluminium in view of the fact that the slags then obtained belonging to the ternary system $CaO.Al_2O_3.SiO_2$, have a lower melting point.

The present invention is based on the consideration that the formation of a fusible slag is not necessarily preconditional to the continuous production of magnesium by thermal reduction on a large scale and that the reduction can be effected at comparatively low temperatures (below about 1,600° C.) in a rotary-drum furnace, which renders it possible to remove the residue of the reaction continuously in the form of solids.

A further advantage of employing a rotary-drum furnace in accordance with the present invention is that a uniform distribution of temperature occurs in the charge during the reaction, a circumstance which has a favourable effect on the uniform liberation of the magnesium vapours. Moreover, the method of the present invention renders the use of the expensive aluminium as reducing agent superfluous since it is preferable to employ silicon alone for that purpose, inasmuch as the residues consisting solely of CaO and $SiO_2$ actually have the highest melting point—the object in view in this case—and have no tendency to cake. Finally, however the employment of a rotary-drum furnace affords the very substantial advantage of enabling the process to be carried out in a continuous manner with the aid of externally applied heat already at temperatures ranging between about 1,100° and 1,300° C.

I preferably employ silicon, or ferrosilicon as the reducing agent in my process, since the slags then obtained have the highest melting point. Thus when employing a 90 percent ferrosilicon for the reduction, the melting point of the slags obtained when using magnesite as the starting material is in accordance with its composition $2MgO.SiO_2$ about 1,900° C., whereas with dolomite as the starting material it amounts to about 2,100° C., the composition of the slag corresponding to the compound $2CaO.SiO_2$.

In addition to silicon, or ferrosilicon, aluminium, or mixtures of the two can be employed as reducing agents for the magnesia or the raw materials (such as dolomite) containing same. Particular advantage attaches to the use of certain alloys, consisting substantially of aluminium and silicon—in addition to certain quantities of iron if desired—such as are formed in the thermal reduction of aluminous raw materials, especially mixtures of kaolin and alumina, and which it has hitherto been very difficult to employ. Whilst certain of these alloys—for example, those containing about 70 parts of aluminium to 30 parts of silicon—facilitate the formation of easily fusible slags and are therefore less suitable for the process of the present invention, the use of such of these alloys as lead to the formation of slags of high melting point is advantageous in the present case. In these alloys, even the presence of considerable amounts of iron is not detrimental, inasmuch as the temperatures to be employed are insufficient to fuse the iron. At the same time it is particularly surprising that the reduction of the magnesia-bearing raw materials proceeds in such an intensive manner under the conditions in question that even with these ternary alloys of relatively low melting point temporary fusion does not occur to a sufficient extent to preclude the employment of a rotary-drum furnace.

In the following table a number of typical examples of such alloys have been set out and the approximate composition of the slags obtained in the reduction of magnesite and dolomite, respectively, with such alloys as well as the approximate melting points of the aforesaid slags have been given. It appears therefrom that the melting points of the slags are sufficiently high to allow the process to be carried out at temperatures below about 1,600° C. without incurring the danger of the reaction residue becoming fused.

| No. | Composition of alloy | Approximate composition of slag— | | Approximate melting point of slag— | |
|---|---|---|---|---|---|
| | | With magnesite | With dolomite | With magnesite | With dolomite |
| 1 | Percent 30–35 Si 40–50 Al 20–25 Fe | 3MgO.Al$_2$O$_3$.SiO$_2$ | 5CaO.Al$_2$O$_3$.SiO$_2$ | 1850° C. | 1650° C. |
| 2 | 45–50 Si 18–22 Al 32–35 Fe | 9MgO.Al$_2$O$_3$.4SiO$_2$ | 11CaO.Al$_2$O$_3$.4SiO$_2$ | 1750° C. | 1950° C. |
| 3 | 70–75 Si 10–12 Al 15–18 Fe | 21MgO.Al$_2$O$_3$.10SiO$_2$ | 23CaO.Al$_2$O$_3$.10SiO$_2$ | 1850° C. | 2000° C. |

Figure 2:
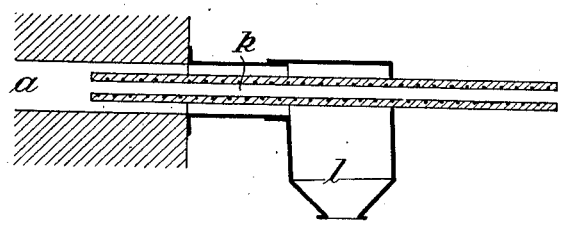

In order more clearly to understand the invention, reference is made to the accompanying drawing, in which Fig. 1 illustrates diagrammatically and by way of example, one embodiment of rotary-drum furnace suitable for carrying the invention into practical effect, and Fig. 2 illustrates a modified arrangement for condensing the magnesium.

Referring to Fig. 1, $a$ is a muffle of heat-resisting steel, which forms a reaction chamber and is rotated either inside a stationary furnace or jointly with a rotatable furnace $b$. Carefully purified and dried hydrogen is passed under a slight positive pressure through the muffle from $c$. Small furnaces are advantageously heated by means of a coil $d$ of chromium-nickel or molybdenum wire, the annular space between the heating coil and the muffle $a$ being designed as a hydrogen jacket. A charging device $f$ is mounted at that end at which the hydrogen is admitted into the muffle whilst a device $g$ for discharging the reaction residue, is provided at the outlet end for the hydrogen. A suitable charging device consists of a worm conveyer $h$, the continuously filled hopper of which serves at the same time as a seal for the gas. The condensation to solid metal of the magnesium vapour liberated from the reaction charge can be advantageously effected on the outer surface of an iron pipe $i$ filled with water and projecting into the muffle from the discharge end. In such case it is sufficient to design the hydrogen outlet so as to serve for the discharge of the reaction residue as well. If necessary the magnesium can be condensed to the liquid state, for example by the arrangement shown in Fig. 2 in which an iron pipe $k$ disposed in or on the muffle and heated to above the melting point of magnesium serves also to carry off the hydrogen, the reaction residue being then discharged into a gas-tight receiver $l$.

I claim:—

1. A process for the continuous production of metallic magnesium by thermal reduction of raw materials containing magnesia in which the reduction is effected in an inert atmosphere while continuously agitating the reaction mixture, at a temperature substantially below the melting point of the reaction residue, by means of silicon while employing the components of said reaction mixture in proportions yielding a residue of a melting point exceeding about 1,650° C.

2. A process as set forth in claim 1 in which the reducing agents consist of alloys of silicon consisting of 30 to 75 per cent Si, 12 to 50 per cent Al, and 15 to 25 per cent Fe.

3. Process as set forth in claim 1, in which the reducing agents employed consist of alloys consisting of between 30 to 35 percent Si, 40 to 50 percent Al and 20 to 25 percent Fe.

4. Process as set forth in claim 1, in which the reducing agents employed consist of alloys consisting of between 45 to 50 percent Si, 18 to 22 percent Al and 32 to 35 percent Fe.

5. Process as set forth in claim 1, in which the reducing agents employed consist of alloys consisting of between 70 to 75 percent Si, 10 to 12 percent Al and 15 to 18 percent Fe.

6. A process for the continuous production of metallic magnesium by thermal reduction of calcined dolomite in which the reduction is effected in an inert atmosphere while continuously agitating the reaction mixture, at a temperature substantially below the melting point of the reaction residue, by means of silicon while employing the components of said reaction mixture in proportions yielding a residue of a melting point exceeding about 2,100° C.

7. A process for the continuous production of metallic magnesium by thermal reduction of raw materials containing magnesia comprising the steps, adding a reducing agent containing silicon to the raw material, heating and continuously agitating said mixture in an inert atmosphere, and discharging said residue in solid form, said reducing agent being added in an amount to yield a residue having a melting point exceeding about 1,650° C.

HELLMUTH SELIGER.